Dec. 14, 1965     F. A. FASSBENDER     3,223,091
FILTER PIPE
Original Filed March 23, 1961
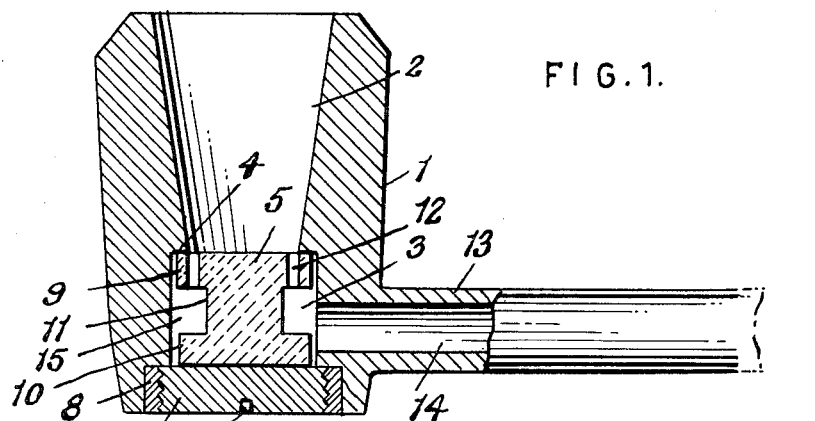
FIG. 1.
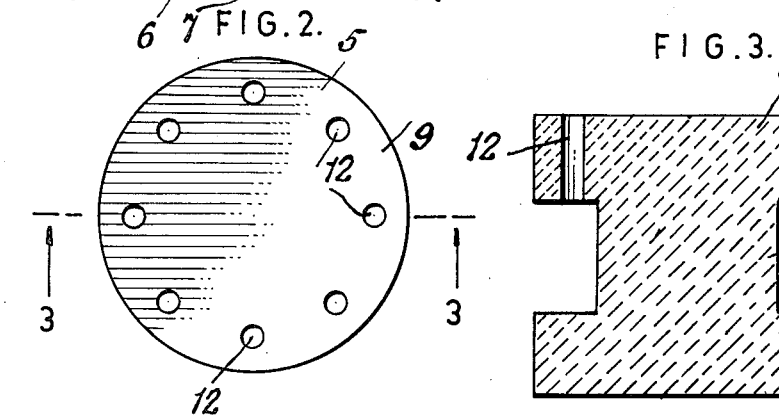
FIG. 2.
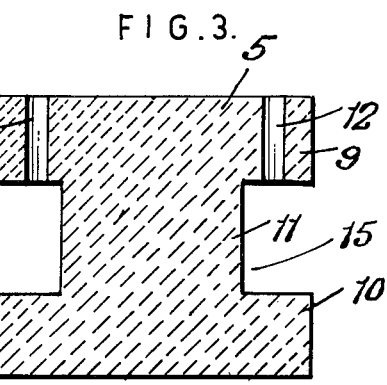
FIG. 3.
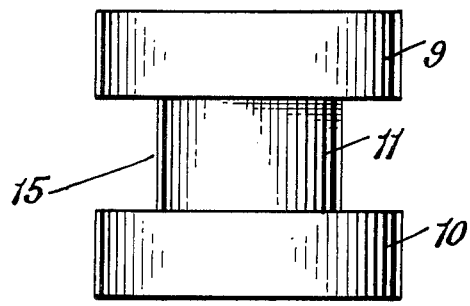
FIG. 4.
INVENTOR
Frederick A. Fassbender
ATTORNEY

United States Patent Office 3,223,091
Patented Dec. 14, 1965

3,223,091
FILTER PIPE
Frederick A. Fassbender, West Orange, N.J., assignor to S. M. Frank & Co., Inc., New York, N.Y., a corporation of New York
Original application Mar. 23, 1961, Ser. No. 97,839, now Patent No. 3,079,927, dated Mar. 5, 1963. Divided and this application Nov. 13, 1962, Ser. No. 236,878
1 Claim. (Cl. 131—206)

This invention relates to filters, and more particularly to a type employed in smoking pipes, and one of the objects of the invention is to provide a filter of this kind for the filtration of nicotine and tars and which will be highly effective for its intended purpose.

The application is a division of my co-pending application Serial No. 97,839, filed March 23, 1961.

It is an object of the invention to provide a filter of this nature which can be made in one piece and composed of a highly porous and liquid-absorbent ceramic material and which will be found very suitable for filtration use.

It is an object of the invention to provide a filter of this kind which can be easily fitted in and removed from the bowl of a pipe; which can be inexpensively made and sold and which, by its use, will add materially to smoking pleasure.

More particularly, the invention contemplates the provision of a filter of substantially spool-shape, and one having spaced apart disks connected by an integral neck of less diameter than the disks, thus resulting in the formation of an annular groove between the disks, the uppermost of the disks being provided with a plurality of perforations extending through it and which enter at one end into the groove and enter at the other end into the tobacco well of the bowl of the pipe in which the filter is fitted. The invention further contemplates the integral formation of the disks and connecting neck and of a ceramic material of highly porous and absorptive nature so that the filter provides ample filtering results in and of itself without requiring filling material or similar fibrous elements for use in conjunction with it.

With these and other objects to be hereinafter set forth in view, I have devised the arrangement of parts to be described and more particularly pointed out in the claim appended hereto.

In the accompanying drawing, wherein an illustrative embodiment of the invention is disclosed, FIG. 1 is a longitudinal vertical sectional view through a smoking pipe in which the improved filter is contained;

FIG. 2 is a top plan view of a filter constructed according to the invention;

FIG. 3 is a sectional view, taken substantially on the line 3—3 of FIG. 2, looking in the direction of the arrows, and FIG. 4 is a side elevational view of the filter.

The improved filter may be used in pipes of various forms and styles and the pipe of the structure shown in the drawing is illustrative of an example of a type of pipe in which the filter may be fitted.

In the drawing, the bowl of the pipe is indicated at 1, and it may be made in various known shapes and may be composed of wood or any other material found suitable for pipe bowl construction. The bowl is provided with a tobacco-receiving well 2 and located below the same is a filter chamber 3, defined at its upper end by an annular shoulder 4.

The filter, generally indicated at 5, fits within the chamber 3 and is confined therein between the shoulder 4 and a closure plug 6 located at and closing the bottom of the chamber 3. The plug 6 is threadably received in a ring 8 secured in the lower part of the pipe bowl, or the plug can be threaded or otherwise removably fitted directly into the lower part of the bowl. The filter 5 is readily removed for the replacement of another filter by removing the plug 6, which can be readily done by inserting a tool or coin within a slot 7 provided in the plug, and unthreading the same.

The filter 5 is shown in detail in FIGS. 2, 3 and 4 and it is preferably composed of ceramic and other materials scientifically compounded to produce a high-refractory, non-toxic body having highly absorptive, hygroscopic characteristics which aid materially in the removal of moisture, toxic acids, tars and solid particles, thus filtering the smoke while retaining the desired tobacco taste for the smoker.

A filter of the character described may be successfully produced by a combination of the following materials: wood flour (10–15%); primary kaolin (30–35%); ball clay (10–15%) and organic binder (1–2%). These materials are mixed by suitable mechanical means into a homogeneous mixture. The material is then molded into the required spool shape and the spools are then fired in a kiln at high temperature. By means of this sintering a change takes place; the wood flour burns out, leaving voids such as appear in a sponge, and the individual particles bind together and form the porous unit or filter.

The filter, when positioned in a smoking pipe, is highly absorbent and it retains tars and nicotinic acid and after ten to twenty smokes it becomes completely saturated, at which time its weight has increased materially or more than doubled. At this point it assumes a dark brown or nearly black color which indicates that it has lost its effectiveness as filter and should be removed from the pipe and discarded and replaced with a new one.

In the form shown, the filter is substantially spool-shaped, the same thus having an upper disk 9 and a similar lower disk 10 spaced therefrom. The two disks 9 and 10 are integrally connected by a smaller diameter cylindrical neck 11, the shape of the filter thus resulting in the formation of an annular groove 15 between the two disks 9 and 10.

The top disk 9 is provided with a ring of spaced holes 12 extending through it. At one end, these holes are in connection with the tobacco well 2 and at the other end they communicate with the groove 15.

The stem or shank of the pipe is indicated at 13 and the same may be formed as an integral extension of the bowl 1 or it may be a separately fitted element. It is provided with the usual smoke passage 14 communicating at one end with the filter chamber 3.

When the filter is fitted in place in the chamber 3 as clearly shown in FIG. 1, the neck portion 11 of the filter is spaced from the inner wall surfaces of the cylindrical chamber 3, thus providing an annular, unfilled chamber with which the end of the smoke passage 14 communicates. Since all parts of the filter are composed of a porous, highly absorbent ceramic material, a filtering surface of substantially large capacity is provided and the use of separate packings or fillings often used in various types of tobacco filters is rendered unnecessary.

When the filter becomes discolored by use as heretofore mentioned, the plug 6 is unthreaded and the filter is thus rendered accessible and it can be readily dropped out of the bottom of the bowl and a new filter inserted.

While I have herein disclosed the filter as being applied to a pipe of a certain specific construction, it will be apparent that the filter might be readily used in pipes of other form, and other changes can be made without departing from the spirit of the invention.

Having thus described a single embodiment of the invention, it is obvious that the same is not to be restricted thereto, but is broad enough to cover all structures coming within the scope of the annexed claim.

What I claim is:

A filter adapted to be fitted within a tobacco chamber in a pipe and which pipe has an annular downwardly-facing shoulder at its lower end and a plug closure at the bottom of the bowl, with such shoulder and plug closure defining a filter-holding chamber between them, the improvements consisting in a spool-shaped porous filter confined in the filter-holding chamber and below the shoulder, said filter having a central, solid and imperforate cylindrical neck defining an annular space between it and the interior of the bowl, the filter having disks of larger diameter than the neck at the opposite ends of the neck, said disks each having a marginal edge portion projecting beyond the periphery of the neck, the upper one of said disks having a plurality of holes extending through its marginal edge portion beyond the periphery of the neck, said holes constituting smoke passages which establish direct communication between the interior of the pipe bowl and the annular chamber located around the neck of the filter the upper surface of said upper disk adapted to contact and support a charge of tobacco located within the tobacco chamber.

References Cited by the Examiner

UNITED STATES PATENTS

| | | | |
|---|---|---|---|
| 940,184 | 11/1909 | Nicholes | 131—206 |
| 1,027,838 | 5/1912 | Glenn | 131—205 |
| 1,028,906 | 6/1912 | Reed | 131—205 |
| 1,480,268 | 1/1924 | Kidwell. | |
| 1,619,090 | 3/1927 | Reiser | 131—206 |
| 2,045,779 | 6/1936 | Ikeda | 131—203 |
| 2,068,866 | 1/1937 | Pedery et al. | 131—206 |
| 2,267,795 | 12/1941 | Lange | 131—206 |
| 2,362,891 | 11/1944 | Dunkelberger | 131—211 X |
| 2,363,144 | 11/1944 | Ricketts | 131—211 |
| 2,388,338 | 11/1945 | Mueller et al. | 131—225 |

FOREIGN PATENTS

| | | |
|---|---|---|
| 215,058 | 4/1924 | Great Britain. |
| 394,400 | 6/1933 | Great Britain. |

ABRAHAM G. STONE, *Primary Examiner.*

F. RAY CHAPPELL, *Examiner.*